United States Patent [19]

Andersen

[11] 4,220,487
[45] Sep. 2, 1980

[54] GELATINOUS COATING FOR ARC WELDING AND METHOD FOR UNDERWATER WELDING

[76] Inventor: Leonard M. Andersen, 46 Alexander Ave., Yonkers, N.Y. 10704

[21] Appl. No.: 954,433

[22] Filed: Oct. 25, 1978

[51] Int. Cl.² ............................................. B23K 35/34
[52] U.S. Cl. ........................................ 148/24; 148/26
[58] Field of Search .................................... 148/24-26

[56] References Cited

U.S. PATENT DOCUMENTS 2,761,796  9/1956  Wasserman ............................ 148/26
3,149,007  9/1964  Chamer .................................. 148/26
3,694,259  9/1972  Chapman ............................... 148/26

Primary Examiner—P. D. Rosenberg
Attorney, Agent, or Firm—Darby & Darby

[57] ABSTRACT

A gelatinous coating comprising particles of electrode coating and thermite suspended in a gel for use as an insulating coating and fluxing agent in underwater arc welding. Also, a method for underwater welding in which the gelatinous coating is scorched and the electric arc is initiated and sustained so as to weld the workpiece. Alternatively, a method for arc welding in flammable or explosive atmospheres.

10 Claims, No Drawings

GELATINOUS COATING FOR ARC WELDING AND METHOD FOR UNDERWATER WELDING

BACKGROUND OF THE INVENTION

The present invention relates to a gelatinous coating for use as an insulating coating and fluxing agent in underwater arc welding and a method of underwater arc welding.

Arc welding encompasses a variety of methods for joining metals, all of which involve the use of an electric arc as a source of heat to melt and join metals. The arc is initiated and sustained between a workpiece and an electrode which are moved relative to each other along the joint to be welded. The electrode can be consumable or non-consumable. Its function is to conduct the supplied current and to sustain the electric arc between the electrode's tip and the workpiece. The consumable electrode is specially prepared so that it not only conducts current and sustains the arc, but it also melts and supplies filler metal to the weld site.

At present, underwater welding involves the use of coated, consumable electrodes of the straight polarity type similar to those used in surface welding. The electrode coating acts as a fluxing agent, which prevents, dissolves, or facilitates removal of oxides and other undesirable surface substances. By creating a reducing or non-oxidizing atmosphere around the arc, the electrode coating prevents contamination of the metal by oxygen and nitrogen. Absent such a reducing atmosphere, the oxygen would readily combine with the metal causing porosity and oxidation of the weld and the nitrogen would cause brittleness, low ductility and possibly low strength and poor corrosion resistance. The electrode coatings also facilitate arcing and insulate the sides of the electrode so that the arc is concentrated in a confined area. In addition, the electrode coating serves as a thermal insulator in underwater welding.

When welding in air, the electrode coating provides a slag deposit which covers and protects the deposited weld. However, thermal shock created in underwater welding can cause the slag formed from the electrode coating to pop off the weld. The resultant quenching and undesirably rapid cooling of the deposited weld may cause embrittlement of the deposited weld. Thus, if the weld is not adequately protected from the water, the strength and ductility of welds formed under water are typically lower than that obtainable in above surface welding.

The objects of the present invention are as follows:

To provide a coating capable of producing underwater welds of greater strength and ductility than previously possible.

To provide a coating with improved thermal insulating characteristics which will facilitate arcing and more efficiently retard heat loss.

To provide a coating which allows more efficient underwater welding and is easier to apply.

To provide a coating which allows for welding in flammable or explosive atmospheres without shut down and relatively expensive flushing out of the atmosphere.

SUMMARY OF THE INVENTION

These and other objects are achieved by a new gelatinous coating for underwater arc welding applications. The gelatinous coating comprises particles of electrode coating and thermite suspended in a gel which is of a viscosity sufficient to retard heat transfer by convection while not so viscous as to be difficult to handle. Thermite, a mixture of ferric oxide and powered aluminum, provides additional heat to compensate for heat lost during the welding process, providing greater ductility and less embrittlement of the deposited weld than possible with conventional underwater welding techniques.

DETAILED DESCRIPTION

In accordance with a preferred embodiment of the invention, a gelatinous coating for use in underwater welding comprises approximately 1% by weight of particles of electrode coating and approximately 5-20% by weight of particles of thermite suspended in a water-based gel. The gelatinous coating must adequately wet the workpiece to be welded. It must be sufficiently viscous to retard heat loss by convection yet it should not be so viscous as to be difficult to handle. The gelatinous coating must be compatible with the weld so that occlusions and embrittlement of the deposited weld does not occur. Also, the gelatinous coating must thermally insulate so as to facilitate electrical arcing and retard heat loss.

A suitable gel comprises a 1% by weight mixture of carboxy vinyl polymer, such as the CARBOPOL brand of carboxy vinyl polymer, manufactured by B. F. Goodrich Chemical Company, in a water base. The CARBOPOL brand carboxy vinyl polymer is supplied as a dry powder in acid form. After mixing the CARBOPOL resin into water, the mixture is neutralized with a suitable base such as sodium hydroxide or ammonium hydroxide so that the mixture thickens to form a clear gel. Other acceptable gels include water-swellable starch, water-swellable gum and water-swellable polymer.

As described hereinabove, electrode coatings serve a multiplicity of functions. They produce reducing or nonoxidizing atmospheres around the arc preventing oxygen and nitrogen contamination. The electrode coatings reduce impurities such as oxides, sulphurs and phosphorus which tend to impair the deposited weld, and they aid in ionization and maintenance of the arc. The electrode coatings provide material, such as silicates, which forms a slag over the deposited weld. The slow solidification of the slag retards heat transfer and allows the deposited weld to cool and solidify slowly. The slow cooling eliminates entrapment of gases within the weld, permits solid impurities to float to the surface and has an annealing effect on the deposited weld.

There are three general types of electrode coatings. These are cellulose coatings, mineral coatings and combinations of cellulose and mineral coatings. Conventional electrode coatings contain combinations of some or all of cellulose, limestone, fluorspar, rutile, titania, asbestos, iron oxide, clay, iron powder, ferrosilicon, ferromanganese and sodium silicate.

Specifications for electrode coatings are issued by the American Welding Society and the American Society for Testing and Materials. Suitable electrode coatings for use with the invention include American Welding Society AWS3 or AWS4 designation electrode coatings.

In the preferred embodiment, in addition to particles of electrode coating, particles of thermite are suspended in the gel. Thermite, a mixture of ferric oxide and powdered aluminum, supplies additional heat to compensate for heat lost during the underwater welding process, providing greater ductility and less embrittlement of the deposited weld. In addition, the partial conductivity of the thermite aids in initiating and sustaining the electric arc.

A composition of 1% by weight of particles of electrode coating and 5-20% by weight of particles of thermite suspended in a gel of 1% carboxy vinyl polymer is preferred. Excessive thermite and/or electrode coating contents are undesirable since the gelatinous coating may become too solid and lose its desirable fluidity. The electrode coating and thermite is preferably ground to a particle size of about 1/16" diameter. For much smaller particle sizes, the basicity of thermite and electrode coating may result in undesirable decomposition of the gel. Mixing of the thermite and electrode coating particles into the gel within twenty-four hours of use will help to reduce gel decomposition.

In the preferred embodiment, the viscosity of the gelatinous coating is approximately 50,000 centipoises, and its density approximates that of water. These characteristics tend to keep the gelatinous coating in place underwater.

After cleaning the workpiece area to facilitate arcing, the welder-diver applies the gelatinous coating either by hand or by pumping to the electrode and/or the workpiece to be welded. Where the electrode is coated, application of the gelatinous coating to a thickness of approximately ¼" around the electrode is preferred. Where the workpiece is coated, application of the gelatinous coating to a thickness of approximately ¾" on the workpiece, depending on variables including workpiece thickness and position of the weld, is preferred. Due to the conductivity and wetting out of the workpiece surface by the gelatinous coating, less cleaning is necessary than where conventional underwater coatings are used.

Although the invention is intended for use with consumable electrodes, such as the SEAWELD brand welding electrode manufactured by Airco, Inc., other welding means such as exothermic, gas metal arc welding (metal inert gas—MIG) and gas tungsten arc welding (tungsten inert gas—TIG) may be used.

Heat created by the arc generated between electrode and workpiece scorches the gelatinous coating creating a relatively tough material sufficient to thermally insulate the welding area by greatly curtailing further heat loss. The insulating characteristic of the scorched gelatinous coating serves to facilitate arcing and improve weld ductility.

The gelatinous coating improves weld quality in underwater welding to such an extent in terms of strength, ductility and welding speed that underwater welding becomes a feasible method of making permanent underwater repairs, particularly on pipelines. The efficiency of the method of underwater welding also makes it an attractive method in large fabrication applications.

The gelatinous coating of the invention also may be used for welding in flammable or explosive environments without shutdown and relatively expensive flushing of the dangerous atmosphere.

It will be apparent to one skilled in the art that the present invention may take a variety of forms, and that the scope of protection affforded this invention is determined by the appended claims.

What is claimed is:

1. A gelatinous coating for use as an insulating coating and fluxing agent in its gelatinous state during underwater arc welding which comprises a gel and particles of electrode coating suspended in said gel, the distribution and quantity of said particles being sufficient to both retain fluidity of the gelatinous coating and to cause said gelatinous coating to be sufficiently electrically conductive to initiate and sustain electrical arcing.

2. The gelatinous coating of claim 1 further comprising particles of thermite suspended in said gel, said particles providing additional heat during the arc welding process.

3. The gelatinous coating of claim 2 wherein said gel is selected from the group consisting of carboxy vinyl polymer, water-swellable starch, water-swellable gum and water-swellable polymer, all in a water base.

4. The gelatinous coating of claim 2 wherein said gel is of a viscosity sufficient to retard heat transfer by convection while not so viscous as to be difficult to handle.

5. The gelatinous coating of claim 2 having a viscosity and density such that the gelatinous coating tends to remain in place underwater.

6. The gelatinous coating of claim 2 wherein said particles of electrode coating and thermite comprise particles of approximately 1/16 " diameter.

7. The gelatinous coating of claim 2 wherein the proportion of said particles of electrode coating and thermite to said gel provides sufficient gel to retain fluidity of the gelatinous coating while providing sufficient thermite to replace heat lost during the arc welding.

8. The gelatinous coating of claim 2 wherein approximately 1% by weight of particles of electrode coating and approximately 5 to 20% by weight of particles of thermite are suspended in the gel of approximately 1% by weight of carboxy vinyl polymer in a water base.

9. The gelatinous coating of claim 1 further comprising a mixture of particles of ferric oxide and powdered aluminum in said gel, said mixture providing additional heat during the arc welding process.

10. The gelatinous coating of claim 1 having a viscosity of approximately 50,000 centiposes.

* * * * *